United States Patent
Scarpa (10) Patent No.: US 7,173,991 B2
(45) Date of Patent: Feb. 6, 2007

(54) METHODS AND APPARATUS FOR SPECTRAL FILTERING CHANNEL ESTIMATES

(75) Inventor: Carl G. Scarpa, Plainsboro, NJ (US)

(73) Assignee: Hitachi, Ltd., Tokyo (JP)

(*) Notice: Subject to any disclaimer, the term of this patent is extended or adjusted under 35 U.S.C. 154(b) by 736 days.

(21) Appl. No.: 10/172,984

(22) Filed: Jun. 17, 2002

(65) Prior Publication Data

US 2003/0231725 A1 Dec. 18, 2003

(51) Int. Cl.
*H04B 1/10* (2006.01)
*H03D 1/00* (2006.01)
*H04L 27/06* (2006.01)

(52) U.S. Cl. .................. 375/350; 375/340; 375/341

(58) Field of Classification Search .......... 375/142, 375/150, 232, 267, 343, 347, 349, 350, 346, 375/140, 141, 229, 230, 285, 341, 340; 370/290, 370/355, 437, 468, 330, 335, 319–321, 479, 370/210; 455/65, 134, 231, 303, 52.1, 52.3, 455/67.1, 67.3, 67.6, 306, 506; 708/222, 708/300, 322

See application file for complete search history.

(56) References Cited

U.S. PATENT DOCUMENTS

| | | | |
|---|---|---|---|
| 5,131,006 A | 7/1992 | Kamerman et al. | |
| 5,170,415 A | 12/1992 | Yoshida et al. | |
| 5,206,886 A | 4/1993 | Bingham | |
| 5,272,446 A | 12/1993 | Chalmers et al. | |
| 5,406,551 A | 4/1995 | Saito et al. | |
| 5,448,601 A | 9/1995 | Choi | |
| 5,483,529 A | 1/1996 | Baggen et al. | |
| 5,502,506 A | 3/1996 | Choi | |

(Continued)

FOREIGN PATENT DOCUMENTS

| | | |
|---|---|---|
| EP | 0844765 A2 | 5/1998 |
| EP | 1 178 630 A1 | 2/2002 |
| EP | 1 178 640 A1 | 2/2002 |
| EP | 1 178 642 A2 | 2/2002 |
| JP | 10303852 A | 11/1998 |
| JP | 2001-136149 | 5/2001 |
| WO | WO 02/23781 A1 | 3/2002 |

(Continued)

OTHER PUBLICATIONS

Perry et. al., "Efficient adaptive complex filtering algorithm with application to channel estimation" IEEE Proceedings—Vis. Image Signal Processing vol. 146, No. 2, Apr. 1999.*

(Continued)

*Primary Examiner*—Mohammed Ghayour
*Assistant Examiner*—Sophia Vlahos
(74) *Attorney, Agent, or Firm*—Straub & Pokotylo; Michael P. Straub (57) ABSTRACT

Methods and apparatus for performing spectral filtering of channel estimates corresponding to a communications channel used to transmit a multi-tone signal are described. A channel estimate is examined to identify portions where significant multi-path interference is present. Real, as opposed to complex, low pass filters are used to perform spectral filtering on the channel estimate to produce a filtered channel estimate. Values corresponding to portions of the channel estimate determined to correspond to areas where significant multi-path interference is present are replaced with the original unfiltered channel estimate values to generate a selectively filtered channel estimate. By using unfiltered channel estimate values in areas of multi-path interference, the errors introduced in such areas by real filtering are avoided without the need to resort to complex filtering.

18 Claims, 12 Drawing Sheets

U.S. PATENT DOCUMENTS

| | | | |
|---|---|---|---|
| 5,732,113 | A | 3/1998 | Schmidl et al. |
| 5,835,731 | A | 11/1998 | Werner et al. |
| 5,848,105 | A | 12/1998 | Gardner et al. |
| 5,912,876 | A | 6/1999 | H'mimy |
| 6,035,003 | A | 3/2000 | Park et al. |
| 6,128,276 | A | 10/2000 | Agee |
| 6,134,286 | A | 10/2000 | Chennakeshu et al. |
| 6,181,714 | B1 | 1/2001 | Isaksson et al. |
| 6,198,782 | B1 | 3/2001 | DeCourville et al. |
| 6,219,334 | B1 * | 4/2001 | Sato et al. ................. 370/210 |
| 6,292,135 | B1 | 9/2001 | Takatori et al. |
| 6,295,326 | B1 | 9/2001 | Tonissen et al. |
| 6,317,470 | B1 | 11/2001 | Kroeger et al. |
| 6,507,602 | B1 * | 1/2003 | Dent .......................... 375/142 |
| 6,608,863 | B1 * | 8/2003 | Onizawa et al. ............ 375/232 |
| 6,795,392 | B1 * | 9/2004 | Li et al. ...................... 370/210 |
| 6,934,346 | B2 * | 8/2005 | Lindoff et al. .............. 375/349 |
| 6,940,932 | B2 * | 9/2005 | Henriksson ................. 375/347 |
| 6,952,562 | B1 * | 10/2005 | Hantke et al. ............. 455/63.1 |
| 6,956,893 | B2 * | 10/2005 | Frank et al. ................ 375/147 |
| 2001/0021182 | A1 | 9/2001 | Wakutsu |
| 2002/0001352 | A1 | 1/2002 | Stirling-Gallacher et al. |
| 2002/0034213 | A1 | 3/2002 | Wang et al. |
| 2002/0037057 | A1 | 3/2002 | Kroeger et al. |
| 2002/0051498 | A1 * | 5/2002 | Thomas et al. ............. 375/262 |

OTHER PUBLICATIONS

H. Ochiai, "Performance Analysis of Deliberately Clipped OFDM Signals", IEEE Transactions on Communications, vol. 50, No. 1, Jan. 2002, pp. 89-101.

C. W. Wong, C. L. Law, Y. L. Guan, "Channel Estimator for OFDM Systems with 2-Dimensional Filtering in the Transform Domain", Nanyang Technological University, 2001, pp. 717-721.

J. K. Moon and S. I. Choi, "Performance of Channel Estimation Methods for OFDM Systems in a Multipath Fading Channels", IEEE, 2000, pp. 161-170.

T. Onizawa, M. Mizoguchi, T. Sakata and M. Morikura, "A Simple Adaptive Channel Estimation Scheme for OFDM Systems", NTT Access Network Service Systems Laboratories, 1999, pp. 279-283.

J. Heiskala, J. Terry, "OFDM Wireless LANs: A Theoretical and Practical Guide", Sams Publishing, 2002, 2 pgs.

Y. Zhao and A. Huang,"A Novel Channel Estimation Method for OFDM Mobile Communication Systems Based on Pilot Signals and Transform-Domain Processing", Helsinki University of Technology, 1997, pp. 2089-2093.

G. Cariolara and F. C. Vagliani, "An OFDM Scheme with a Half Complexity", IEEE Journal of Selected Areas in Communications, vol. 13, No. 9, Dec. 1995, pp. 1586-1599.

P. H. Moose, "A Technique for Orthogonal Frequency Division Multiplexing Frequency Offset Correction", IEEE Transactions of Communications, vol. 42, No. 10, Oct. 1994, pp. 2908-2914.

J. Heiskala and J. Terry Ph.D., "OFDM Wireless LANs: A Theoretical and Practical Guide", Sams Publishing, pp. 1-315, (2002).

* cited by examiner

METHODS AND APPARATUS FOR SPECTRAL FILTERING CHANNEL ESTIMATES

FIELD OF THE INVENTION

The present invention relates to communication systems and, more particularly, to methods and apparatus for improved spectral filtering of channel estimates, e.g., channel estimates corresponding to a communications channel used to transmit a multi-tone signal.

BACKGROUND

In communication systems, data that can represent a picture, voice, etc., is transmitted through the system using a communication medium or channel. The channel can be wired or wireless. In either case, the channel characteristics, which can be represented as, e.g., a channel transfer function, often distorts the data that it transmits. In order to compensate for such distortion, receivers make channel estimates, which they then use, to try and reverse the distortion introduced by the channel.

There are several factors that introduce distortion in transmitted signals. For example, noise, inter symbol interference (ISI), etc., and in wireless systems multi-path. In wireless systems, when a transmitter transmits a signal, it may be reflected off buildings, cars, the ground, etc. before it reaches a receiver, and/or it may arrive at a receiver without being reflected at all. In cities, reflections can be particularly problematic. Since reflected signals travel longer paths, they arrive at a receiver at a slightly later time than the original signals and appear as a ghost signal. The staggered received signals, e.g., original and ghost signals, interfere with each other and the receiver receives a distorted signal. Such interference is sometimes called multi-path interference.

Orthogonal Frequency Division Multiplexing (OFDM) is a signal processing technique used to transmit data in several modern communications systems. In the case of OFDM systems tones are transmitted orthogonal to each other to thereby avoid or minimize mutual interference. In an OFDM system, each tone may be used to transmit a different unit of data, e.g., symbol, in parallel. In many situations, OFDM receivers depend on accurate estimates of the channel transfer function to reverse distortion introduced by the channel. A key feature of OFDM is the fact that channel equalization is performed not by a multi-tap filter, but by a single division across each of a plurality of spectral bins, where each bin represents channel information for a particular tone generated over one or more time periods. The division operation is performed after an estimate of the channel's transfer function, i.e., a channel estimate, is obtained.

Channel estimates in many OFDM systems are calculated by processing pilot tones sent by a transmitter. At the receiver, a known pilot tone pattern is expected. Any deviation of the received pilot tone from this expected pattern, in amplitude and/or phase, is measured and declared the channel estimate, x. Once the channel estimate has been determined, each received FFT data bin is divided by this channel estimate. Poor estimates of channel transfer functions lead to a lower recovered signal to noise ratio (SNR) signal and hence poorer (higher) bit error rates.

As is known in the art, a current problem with the known channel estimation technique is noise enhancement. Spectral bins that have experienced destructive multi-path interference have a low value channel estimate, x. The simple 1/x division operation is non-linear and tends to enhance the noise within each bin that has a low channel estimate absolute value. Unfortunately, while the signal of interest will be set to its proper level, the noise within a bin will be enhanced by the inverse of the depth of any multi-path null that may occur in a tone corresponding to a bin, possibly rendering the data bin for a particular tone useless. One method to avoid this problem is to perform a spectral filtering operation on the channel estimate.

The idea behind channel estimate filtering exploits the fact that adjacent bins will be correlated by the coherence bandwidth of the channel. OFDM systems use a guard interval to protect against multi-path. The guard interval can be, e.g., a copy of a portion of the signal. The duration of the guard interval sets what the expected coherence bandwidth of the channel will be. The goal of OFDM is to make the coherence bandwidth of the signal smaller than that of the channel. If successful, all bins remain orthogonal and data can be recovered, even in severe multi-path, with no inter-channel interference (ICI) and/or inter-symbol interference (ISI) interference.

The guard interval determines how much filtering can be performed in the frequency domain. The goal of a spectral estimate filter is to smooth the noise corrupted spectral estimate, while not distorting the multi-path estimate. To achieve this, the bandwidth of the spectral filter, when transformed into the time domain, should pass multi-path information with no distortion. That is, the bandwidth of the spectral filter should be equal to or larger than the guard interval, if viewed from the perspective of bandwidth and not time delay. In addition, the phase relationship between the in-phase and quadrature components of the multi-path should not be disturbed. The multi-path information contained in the guard interval should be passed within the filters pass-band and all other portions of the symbol duration should be rejected. Generally, in the art, a complex low pass filter is used for this task since complex filter transform characteristics have the advantage of not necessarily being symmetrical in contrast to real filters which are symmetrical.

Complex finite impulse response (FIR) filters, regardless of the number of taps used, usually require 4 multiplies and 2 adds per tap, in addition to the adder tree that sums the filter's inner product. Real filters only require 1 multiply per tap. Therefore, complex low pass filters are 4 times as complex, in terms of multiplies per tap at least, than real only filters, which may be implemented, e.g., as either fixed, or time varying via the least mean square (LMS) algorithm.

The savings in hardware computation complexity could be significant if real and not complex filters could be used for spectral filtering as part of a channel estimation and compensation process in a multi-tone communication system. Unfortunately, low pass filtering using real filters in the presence of multi-path interference, with its potentially severe nulls, tends to cause distortion in the channel estimate. Since multi-path can be a problem in OFDM systems the use of real filters as part of a channel estimation process has the potential for worsening reception capabilities where OFDM already suffers from multi-path interference.

Accordingly, there is a need for methods and apparatus for simplifying the complexity of spectral filtering in multi-path systems. It would be desirable if spectral filtering could be implemented using real low pass filters instead of complex low pass filters as part of the channel estimation process. However, in cases where real low pass filters are used, the methods and apparatus should address the problem of distortion introduced by real as opposed to complex, low pass filtering, when multi-path interference is present.

SUMMARY OF THE INVENTION

Methods and apparatus for simplifying spectral filtering of channel estimates, e.g., channel estimates corresponding to a communications channel used to transmit a multi-tone signal such as an orthogonal frequency division multiplexed signal, are described.

Channel estimates of a multi-tone signal correspond to multiple tones, e.g., frequencies, which form part of a communications channel. A set of channel estimate data, referred to as a bin or spectral, is generated for one or more tones. The term bin is used to refer to channel estimate data for individual tones since channel estimate data for a tone may be generated from data collected for the tone over a period of time and stored, e.g., in what may be thought of as a storage bin.

Multi-path interference can cause significant NULLs for some bins but not others. Such NULLs can corrupt the overall channel estimate particularly if the portions (bins) of the channel estimate corresponding to the multi-path nulls are subject to real filtering. While complex low pass filtering using complex filters is known to result in improved channel estimates, the inventor of the present application realized that real low pass filtering of channel estimates in the frequency domain, which is easier and less costly to implement than complex filtering, can improve channel estimates where significant multi-path does not exist but tends to degrade the quality of the channel estimate to in portions of the channel estimate where significant multi-path exists. The degradation to the channel estimate due to real filtering in portions of the channel estimate where severe multi-path exists tended to degrade those portions of the channel estimate to a degree that they were often worse then the corresponding unfiltered portions of the channel estimate.

In accordance with the present invention, a real low pass filter, e.g., a simple N tap filter, is used to filter a channel estimate which may be expressed as an estimate of the channel state or the inverse of the channel state. To avoid channel measurement distortions caused by real, as opposed to complex, filtering, selective filtering of spectral bins which comprise the channel estimate is performed.

Selective spectral filtering of a channel estimate is performed in one exemplary embodiment by first performing real filtering on an entire channel estimate, e.g., across the entire channel spectral estimate. The channel estimate is examined to identify bins corrupted by significant amounts of multi-path interference. Data, e.g., bins, in the filtered channel estimate corresponding to bins where significant amounts of multi-path interference is determined to be present, are replaced with the corresponding unfiltered values from the original channel estimate. The filtering and replacing operation produces a channel estimate that was selectively filtered using real only filters in portions, e.g., frequencies, of the channel estimate where significant multi-path interference was not identified. In this manner, the degrading effect of performing real filtering on portions of a channel estimate where significant multi-path interference is present can be avoided.

In one particular embodiment to spectral bins of a channel estimate that are a significant distance away from unity are first marked via examination of the channel inverse, e.g., by comparing channel state information generated from the channel inverse to a threshold. Spectral bins which are a significant distance away from unity signifying that they are corrupted by multi-path, either constructive or destructive, are marked, e.g., identified. Low pass filtering using real weights only is then performed across the spectral estimate, i.e., the channel estimate. Once the spectral low pass filtering is completed, the marked bins are replaced with their original unfiltered values. This process avoids significant distortion due to filtering with real low pass filters, can be used to perform low pass filtering on noisy spectral bins, and has the potential to be implemented using filters that require as little as ¼ the amount of hardware used to implement complex filters.

Additional features, embodiments and benefits of the methods and apparatus of the present will be discussed below in the detailed description that follows.

DETAILED DESCRIPTION

Figure 1:
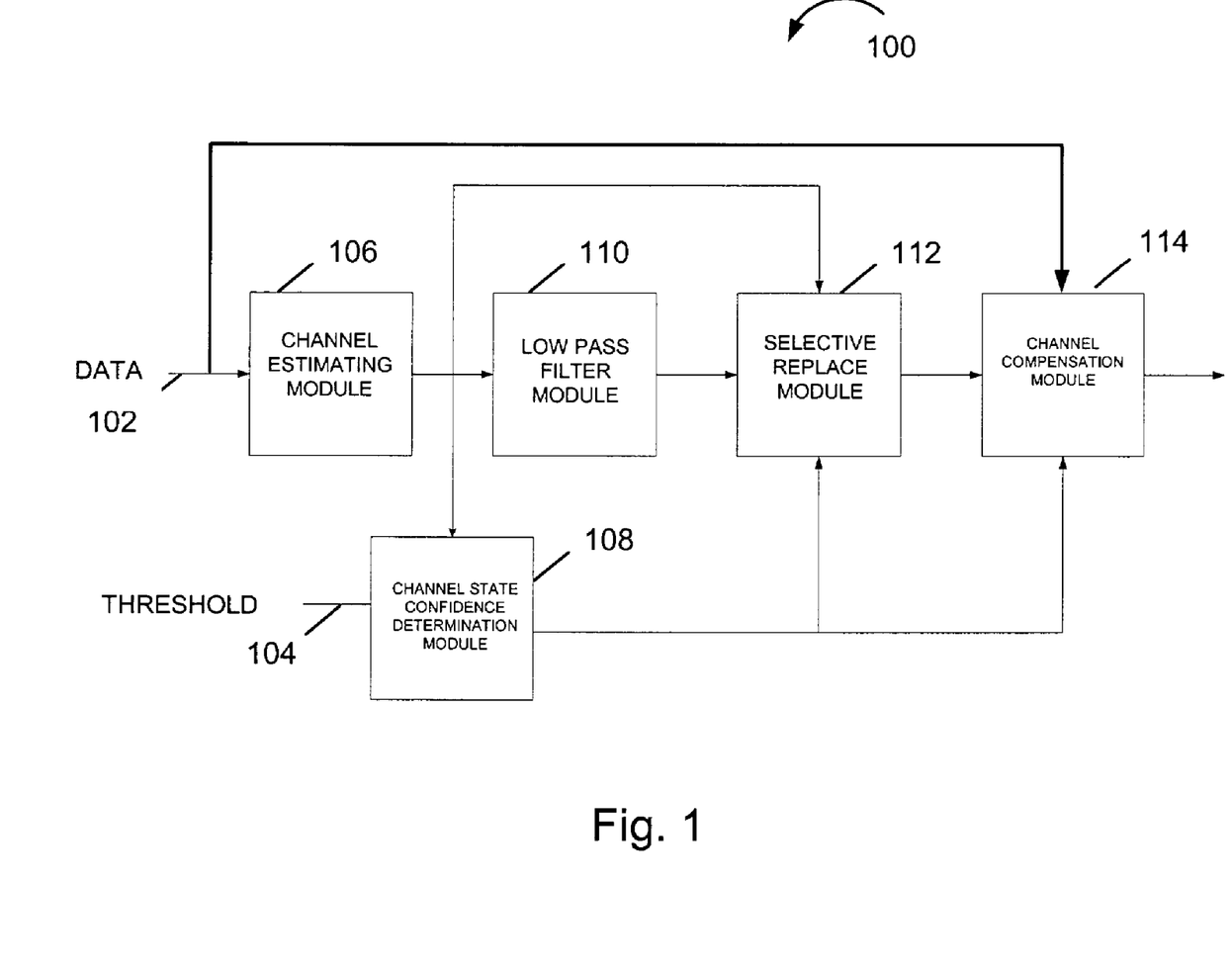
FIG. 1 is a block diagram illustrating a communication system for implementing selective spectral filtering using real filters in accordance with the present invention.

FIG. 1 is a block diagram illustrating one embodiment of a communication system 100 implemented in accordance with the present invention. Communication system 100 includes data input 102, threshold input 104, channel estimating module 106, channel state confidence determination module 108, low pass filter module 110, selective replacement module 112 and channel compensation module 114 coupled together as shown in FIG. 1.

Exemplary operation of system 100 and the modules included therein will now be described. As mentioned earlier OFDM systems use channel estimates to try and reverse distortion added to a signal by a channel. Known pilot tones are periodically received at data input 102, and processed by channel estimating module 106. Any deviation of a received pilot tone from the expected pilot tone is determined to be the channel estimate for the tone on which the pilot was received. Channel estimates for tones on which pilots are not received may be based on received, e.g., neighboring, pilot tones. Unfortunately, additional distortion due to short-term noise, and/or multi-path interference may make the channel estimate for the communication channel which includes multiple tones unreliable. Therefore further processing is performed on the channel estimate.

After obtaining a channel estimate from channel estimating module 106 corresponding to the full communications channel which includes multi-path tones, system 100 inputs the channel estimate into low pass filter module 110, channel state confidence determination module 108 and selective replace module 112.

Operation of the low pass filter module 110 will now be discussed. As mentioned earlier performing a spectral filtering operation on the channel estimate helps to reduce the problem of noise enhancement by distorted channel estimates. Complex filters can be used to reduce the negative effects of noise and multi-path.

Real filters are simpler to implement than complex filters and therefore require less hardware to implement than complex filters. As a result, a receiver implemented with real low pass filters can be made smaller, cheaper to manufacture, and will normally consume less power when in operation than a similar device implemented using complex filters. In cases of negligible multi-path, real filters can be used to smooth out a noisy channel estimate, e.g., the I and Q signal components of a channel estimate.

Figure 2:
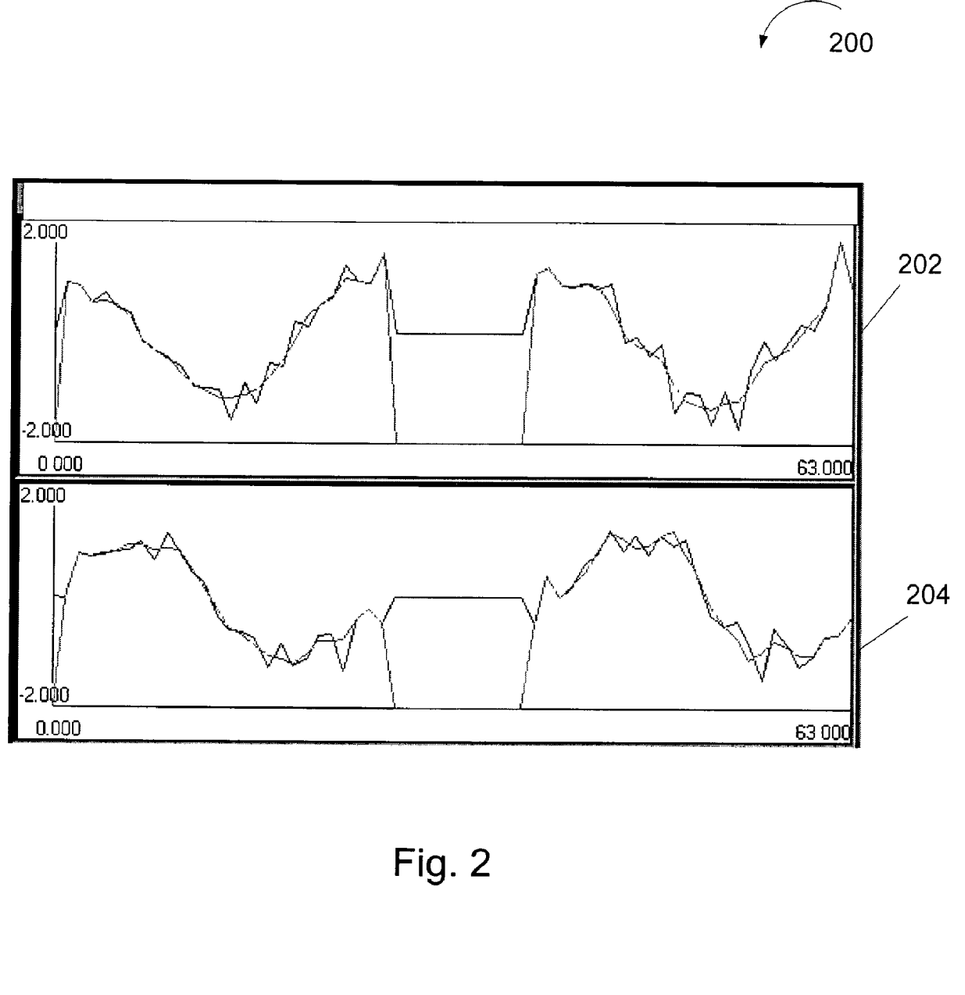
FIG. 2 illustrates in-phase (I) and quadrature (Q) phase signal components of an inverse channel estimate with noise and no multi-path, before and after real low pass filtering.
Figure 3:
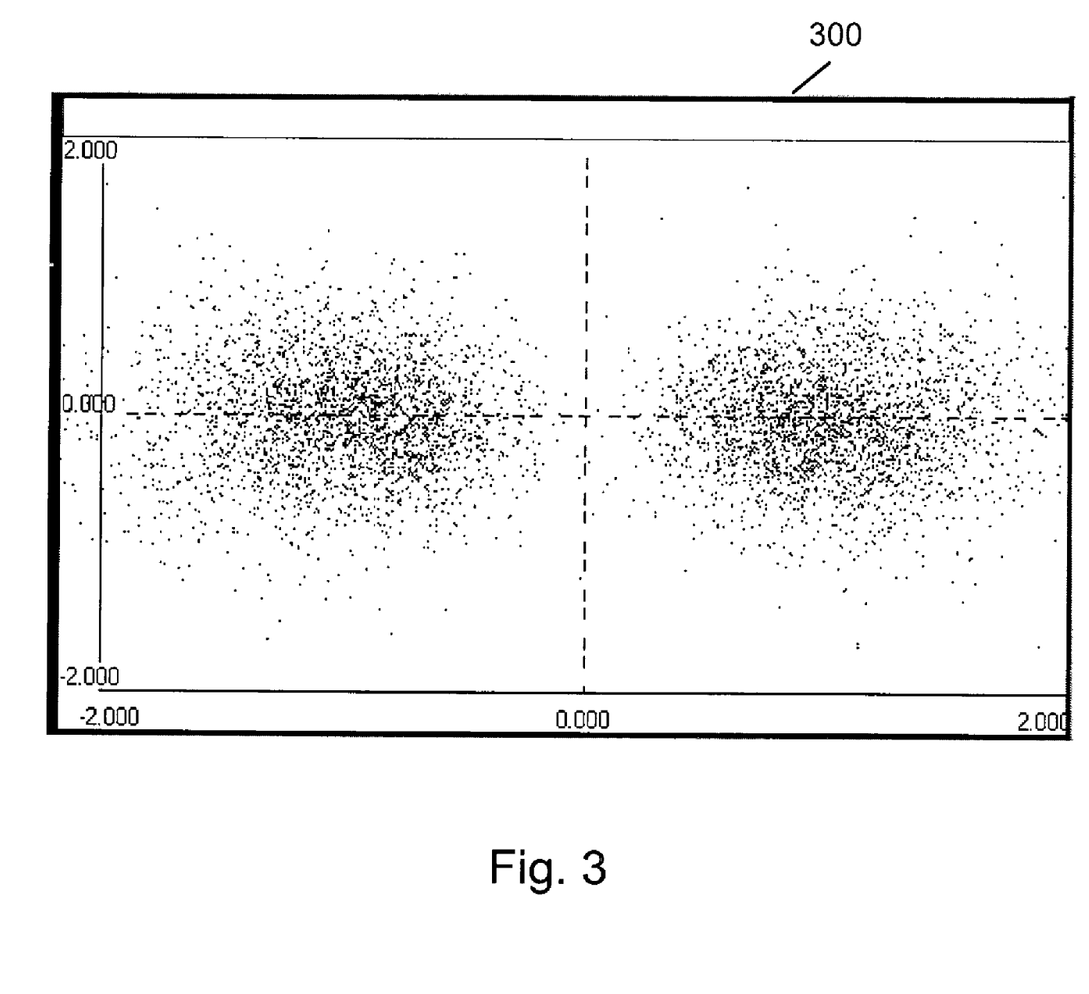
FIG. 3 illustrates a constellation plot after the real low pass filtering of the inverse channel estimate of FIG. 2.

In accordance with the invention, low pass filter module 110 is implemented using one or more real low pass filters, e.g., a 7 tap FIR, used to filter the I and Q portions of a channel estimate. FIG. 2 illustrates a plot 200 of the I 202 and Q 204 components of the inverse of a channel estimate with and without filtering. In FIG. 2, as well as in FIGS. 4, 8, 10, each of the vertical axes corresponds to gain while the horizontal axes correspond to frequency, e.g., tones. The channel estimate is corrupted by noise, but there is no multi-path inference. Note that the filtering smoothes out the noise spikes in the original estimate. FIG. 3 illustrates a plot 300 of the constellation points of the spectral filtering process of a 5 dB bi-phase shift key (BPSK) signal. Since there is no multi-path in this example, there is no constellation distortion. In FIG. 3, as well as FIGS. 5, 9 and 11, the horizontal axis corresponds to the real (I) signal component while the vertical axis corresponds to the imaginary (Q) signal component.

Figure 4:
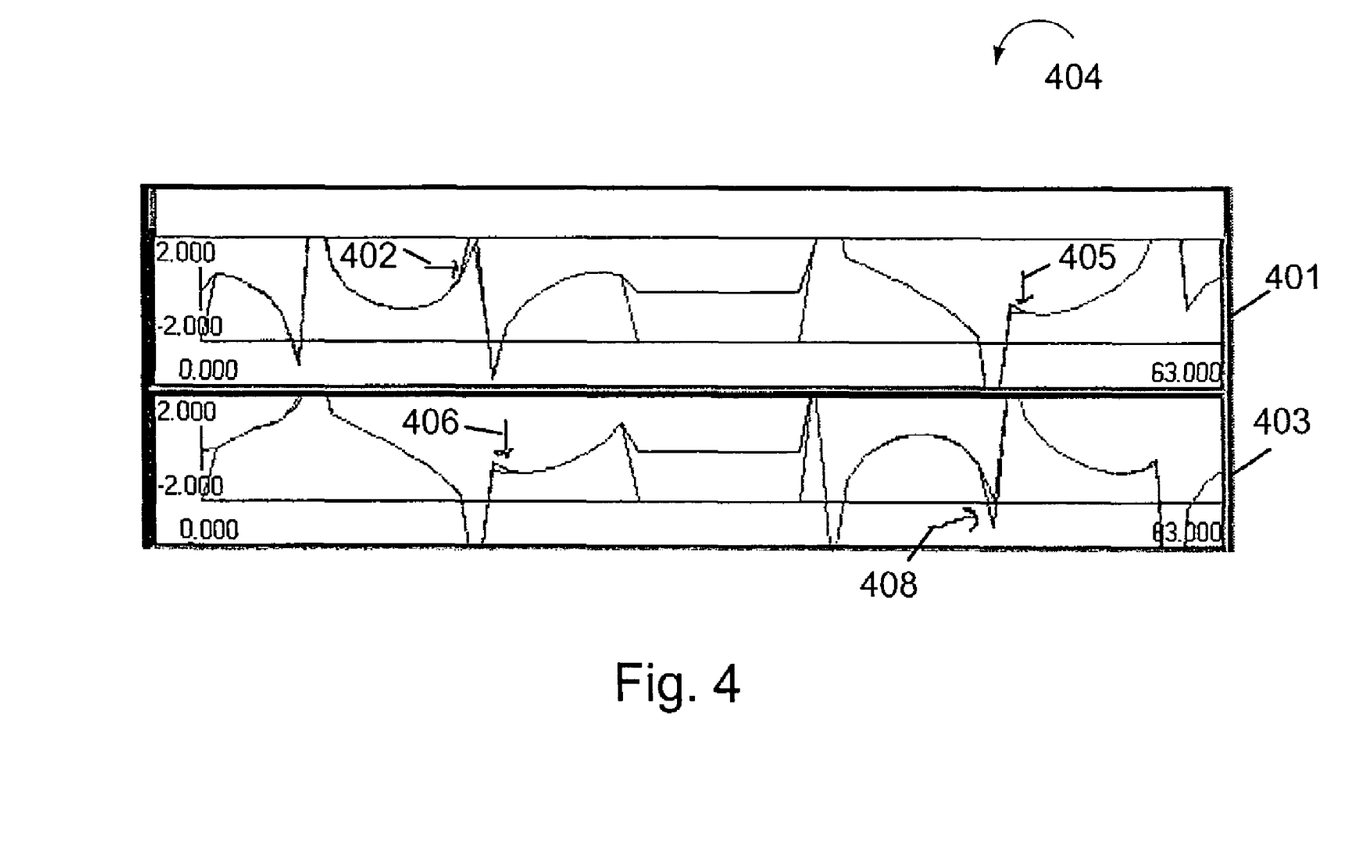
FIG. 4 illustrates I and Q components of an inverse channel estimate with no noise and a 300 ns ghost, before and after real low pass filtering.
Figure 5:
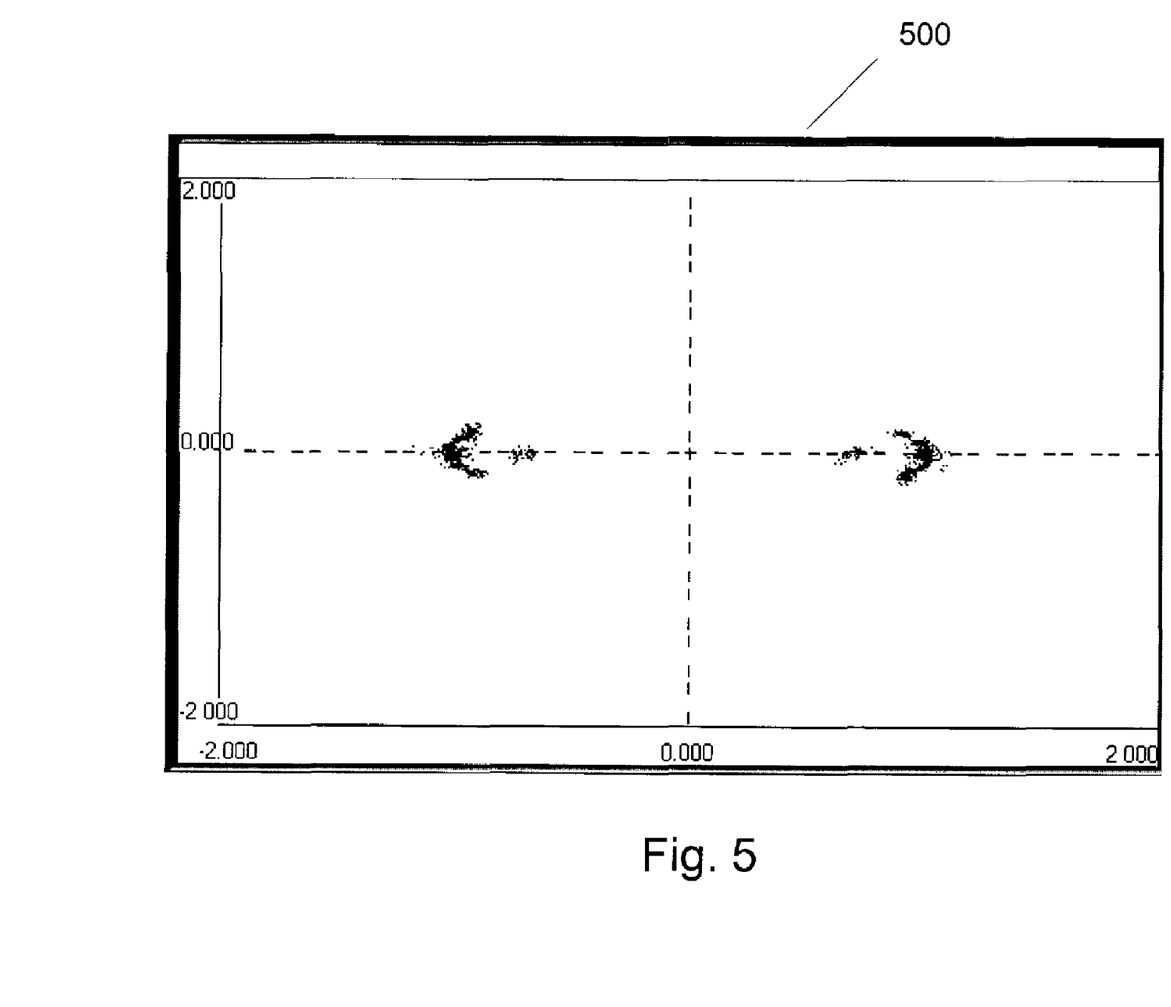
FIG. 5 illustrates a constellation plot after the real low pass filtering of the inverse channel estimate of FIG. 4.

Unfortunately, real filters are often ineffective when multi-path type distortion is present in the signal being processed. Real low pass filtering, in some cases, can add its own distortions to the signal. FIG. 4 illustrates a plot 400 of the I 402 and Q 404 signal components of a noiseless channel inverse with a 300 ns ghost. The arrows 402, 405, 406, 408 point out the distortion that results by filtering with a real low pass filter where multipath nulls exist. FIG. 5 illustrates a constellation plot 500. The effects of real low pass filtering in the presence of multi-path type distortion is illustrated by the distorted, shape of the constellation plot. The recovered SNR for the signal corresponding to the plot 500 of FIG. 5 is only 23 dB. Normally when there is no Gaussian noise, a recovered signal would have an SNR of around 40–50 dB.

Simply replacing complex filters with real filters is not an acceptable solution to reducing the cost of filtering channel estimates of OFDM signals, given the distortion that is added by the use of real filters when multi-path type distortion is present. Therefore, in accordance with the invention, further processing of the channel estimate, e.g., as expressed in the form of channel state information (CSI), is used to minimize distortions induced by real low pass filters as will be discussed below.

Returning to system 100 of FIG. 1, the channel estimate determined by the channel estimating module 106 as expressed in the form of CSI is sent to channel state confidence determination (CSCD) module 108 in addition to the low pass filtering module 110. CSCD module 108 also receives a threshold value from threshold input 104, which is used to make a channel state confidence determination. The threshold may be preset, e.g., fixed, or supplied to the CSCD module 108. The CSCD module 108 generates a confidence state information (CSI) value from the initial channel estimate I and Q values corresponding to each tone by squaring the channel estimate's I and Q values corresponding to a tone and summing them to produce a CSI value corresponding to the tone. Each generated CSI value is compared to the received threshold to detect, e.g., determine or identify, which bins are experiencing significant, e.g., destructive, multi-path interference. In one exemplary embodiment, a CSI value, and the corresponding frequency region of the channel estimate is determined to correspond to a region of significant multi-path interference when the CSI value is below the threshold value. A comparator may be used to perform the comparison operation.

Figures 6, 7:
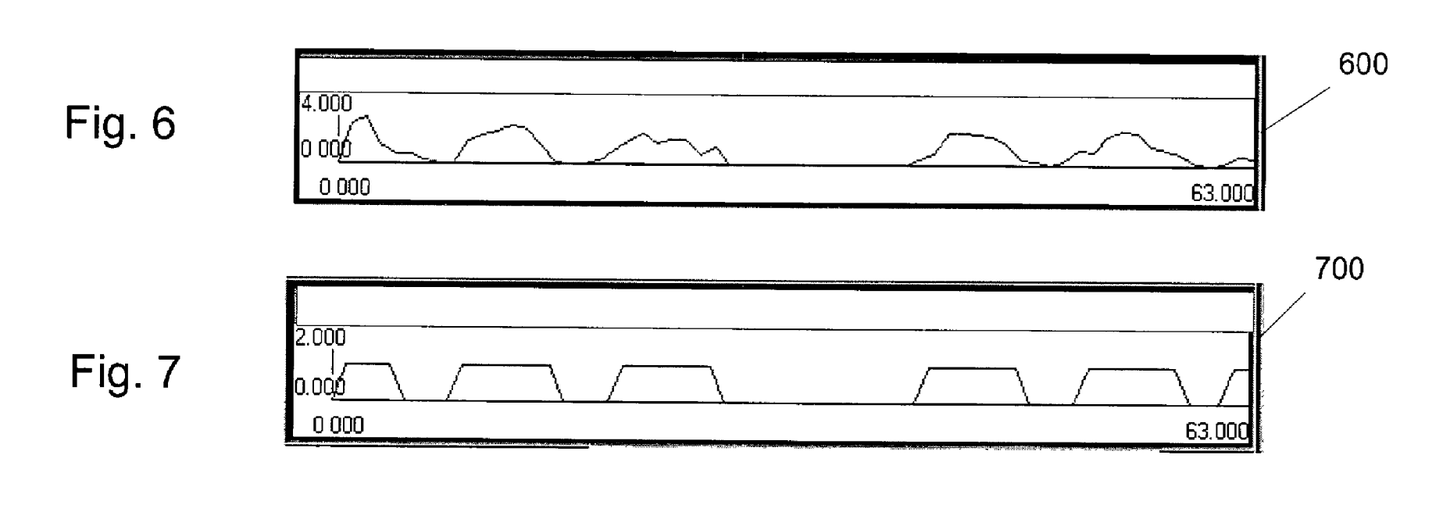
FIG. 6 illustrates a channel state information (CSI) plot of a channel estimate.
FIG. 7 illustrates a channel state information confidence plot corresponding to the CSI plot of FIG. 6.

In the above described manner, a set of CSI values corresponding to the absolute values of the channel transfer function, e.g., one CSI value at each of the tones, is generated. For example, a channel with a transfer function of, $R+jQ$, has a CSI function of, $R^2+Q^2$. FIG. 6 illustrates a plot 600 of the CSI of a channel estimate. In FIG. 6 the horizontal axis corresponds to frequency. Generally, bins suffering from destructive multi-path distortion have low CSI values. The threshold value used by the CSCD module 108 is used to determine which bins, e.g., channel estimate values, are suffering from destructive multi-path. Bins with a CSI value less than the threshold value are marked as suffering from multi-path. The threshold value can be set by an end user to correspond with a level of multi-path that the user considers significant enough to degrade the overall channel estimate significantly. Alternatively, it can be set to a fixed, e.g., pre-selected value.

FIG. 7 illustrates a plot 700 of the channel state information (CSI) confidence plot with a threshold setting of 0.5, resulting in multi-path greater than 6 dB down being flagged. CSI values less than 0.5 correspond to a zero value in the CSI confidence plot of FIG. 7. Information identifying bins marked as being below the threshold are sent from the channel state confidence determination module 108, to selective replace module 112 and channel compensation module 114. In this manner, the selective replacement module 112 and the channel compensation module 114 receive information from the CSCD module 108 indicating which portions, e.g., bins, of the filtered channel estimate are unreliable due to multi-path interference.

In addition to the marked bins information, the selective replacement module 112, also receives the original channel estimate and the low pass filtered channel estimate. The selective replacement module 112 takes the low pass filtered channel estimate values and replaces the values of the bins that are marked as suffering from excessive amounts of multi-path interference with their original values. This way bins that do not experience multi-path interference are low pass filtered with real filters and bins that do experience multi-path interference are not low pass filtered. As mentioned earlier for tone where multi-path is not present, real low pass filters can be used to smooth out noise spikes in channel estimates without the channel estimate degradation encountered when multi-path interference is present.

Figure 8:
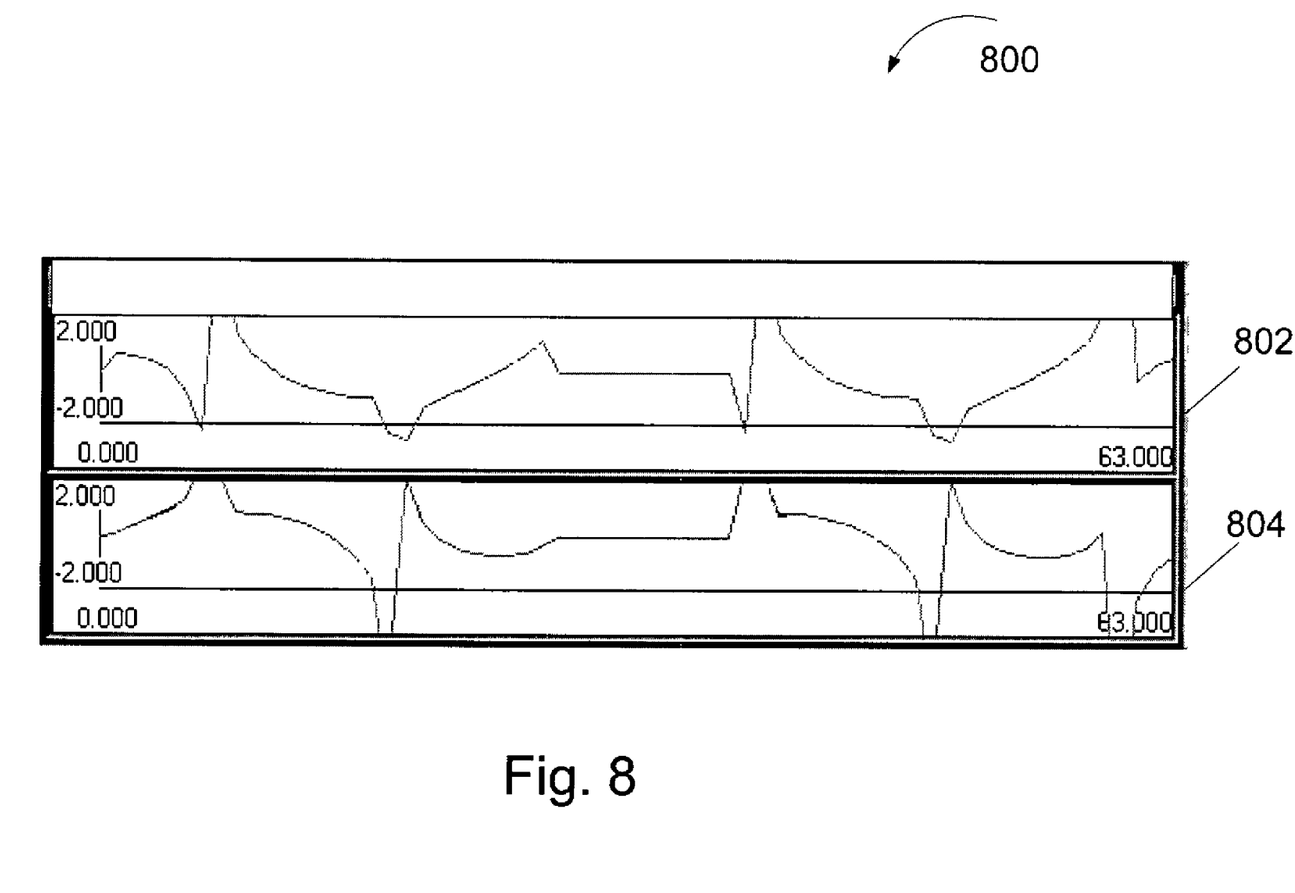
FIG. 8 illustrates I and Q components of an inverse channel estimate with no noise and a 300 ns ghost, before and after selective real low pass filtering in accordance with the invention.
Figure 9:
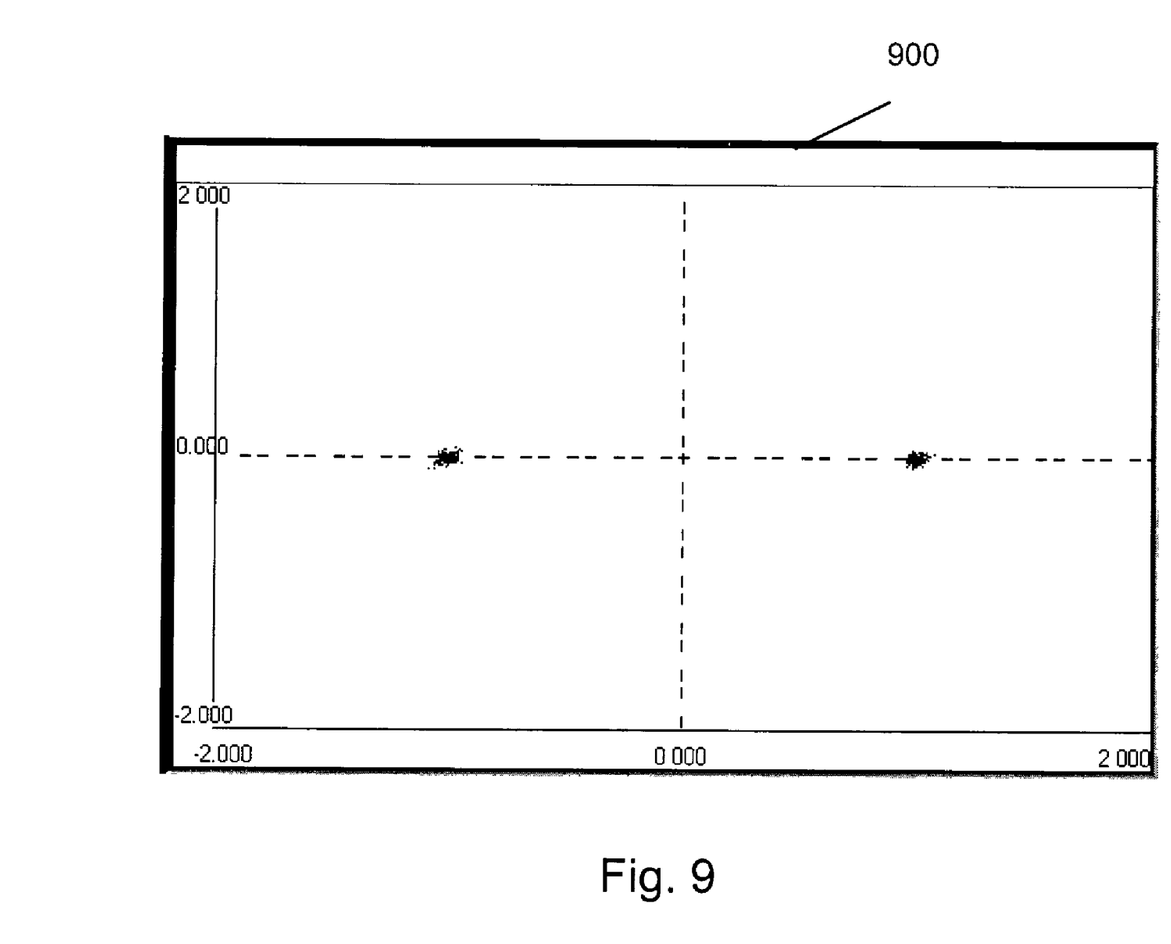
FIG. 9 illustrates a constellation plot after the selective real low pass filtering of the inverse channel estimate of FIG. 8.

FIG. 8 illustrates a plot 800 of the I 802 and Q 804 components of the noiseless channel estimate inverse with the 300 ns ghost used in FIG. 4 and the output of the selective replacement module 112. There is virtually no distortion across the spectrum when the selective filtering technique of the present invention is used. FIG. 9 illustrates the constellation plot 900 of the previous channel estimate after using the selective low pass filtering technique of the present invention. Note the improvement over the constellation plot 500 of FIG. 5. The resulting SNR after application of the method of the present invention used to generate the FIG. 5 plot is 39 dB.

The channel compensation module 114 receives the original data, the selectively low pass filtered channel estimate and information on the regions, e.g., bins, corresponding to significant multi-path interference. The received information may include CSI values corresponding to individual bins. It is not that important for multi-path corrupted bins to be low pass filtered, because most OFDM systems use channel state information with their forward error correction (FEC). In one embodiment, as part of the channel compensation operation bins with multi-path are weighted according to the CSI value corresponding to the bin and therefore are given low confidence weight as part of the channel compensation process and/or as part of an FEC decoding algorithm. Unfortunately, multi-path interference can render information in a bin useless.

Figure 10:
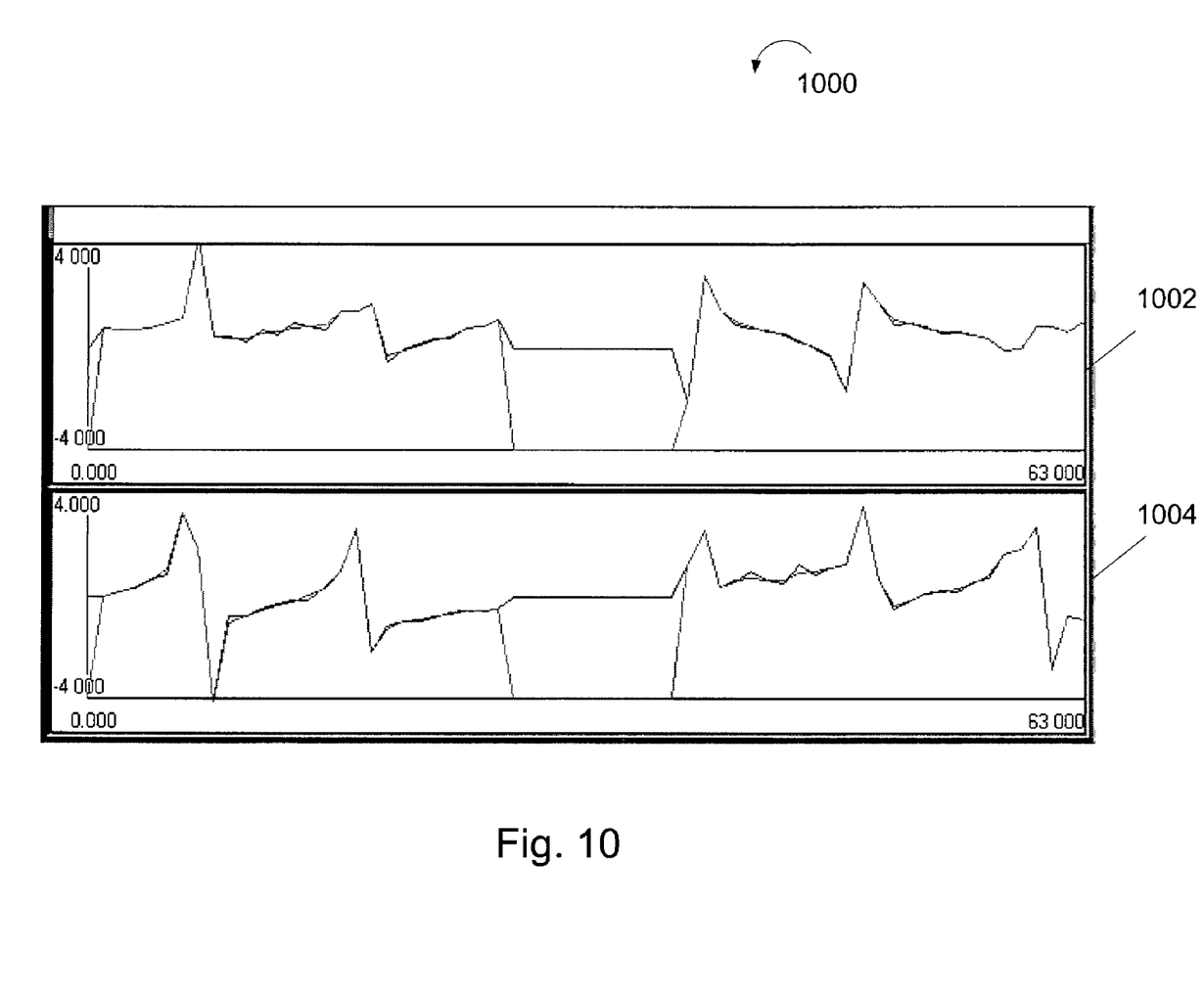
FIG. 10 illustrates I and Q components of an inverse channel estimate with noise and a 300 ns ghost, before and after selective real low pass filtering in accordance with the invention.
Figure 11:
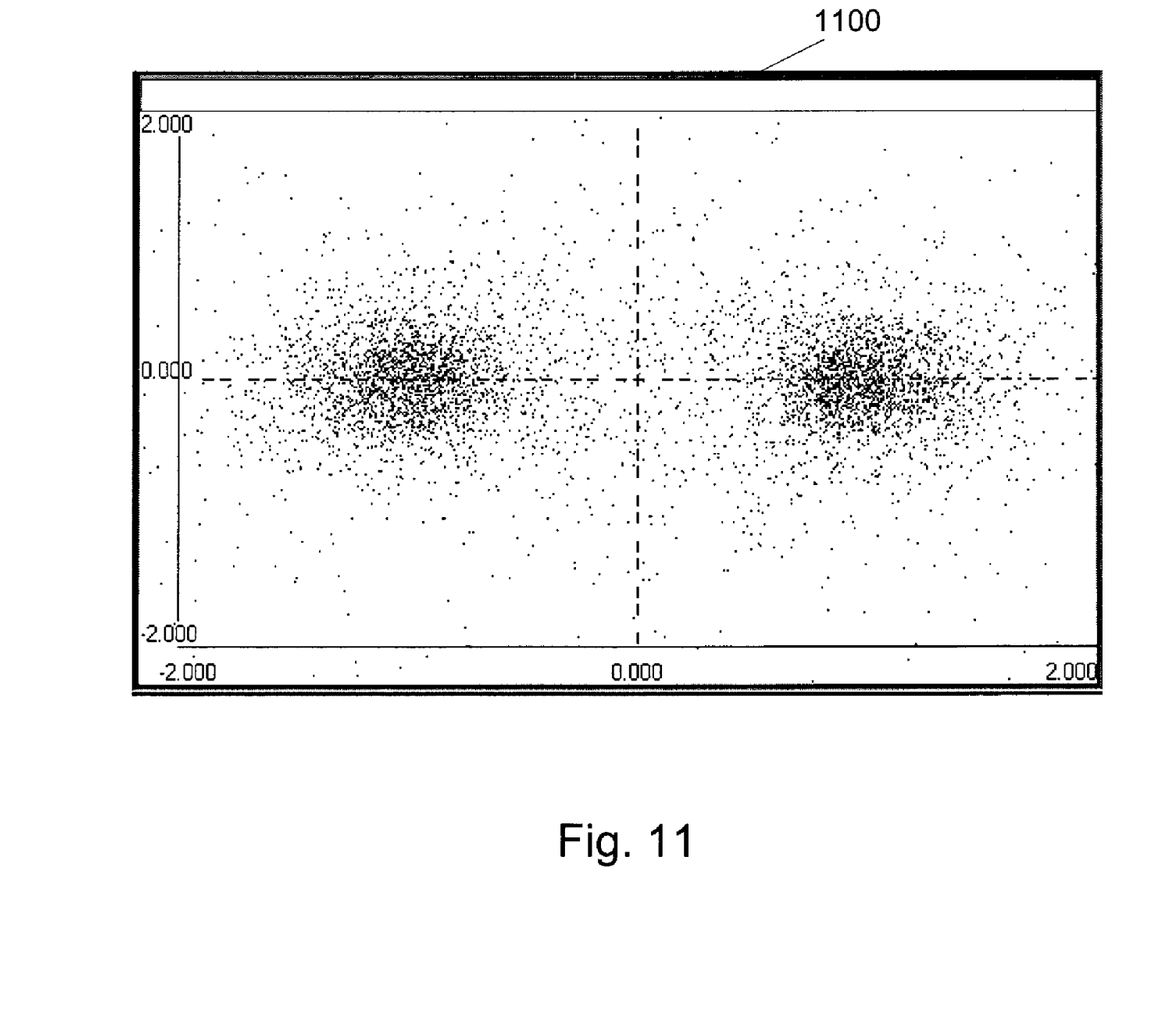
FIG. 11 illustrates a constellation plot after the selective real low pass filtering of the inverse channel estimate of FIG. 10.

FIG. 10 illustrates the I 1002 and Q 1004 components of the spectral plot 1000 of the inverse channel estimate of FIG. 4 with the 300 ns ghost and now with a SNR of 5 dB. The low pass filtering is evident in the smoothing out of noise spikes. FIG. 11 shows the resulting constellation plot 1100 after using the selective filtering technique of the present invention.

The system 100 may be used with burst or continuous OFDM transmissions. System 100 may be part of a receiver in a wireless LAN, e.g., 802.11, HyperMAN, DVB-T, etc.

Figure 12:
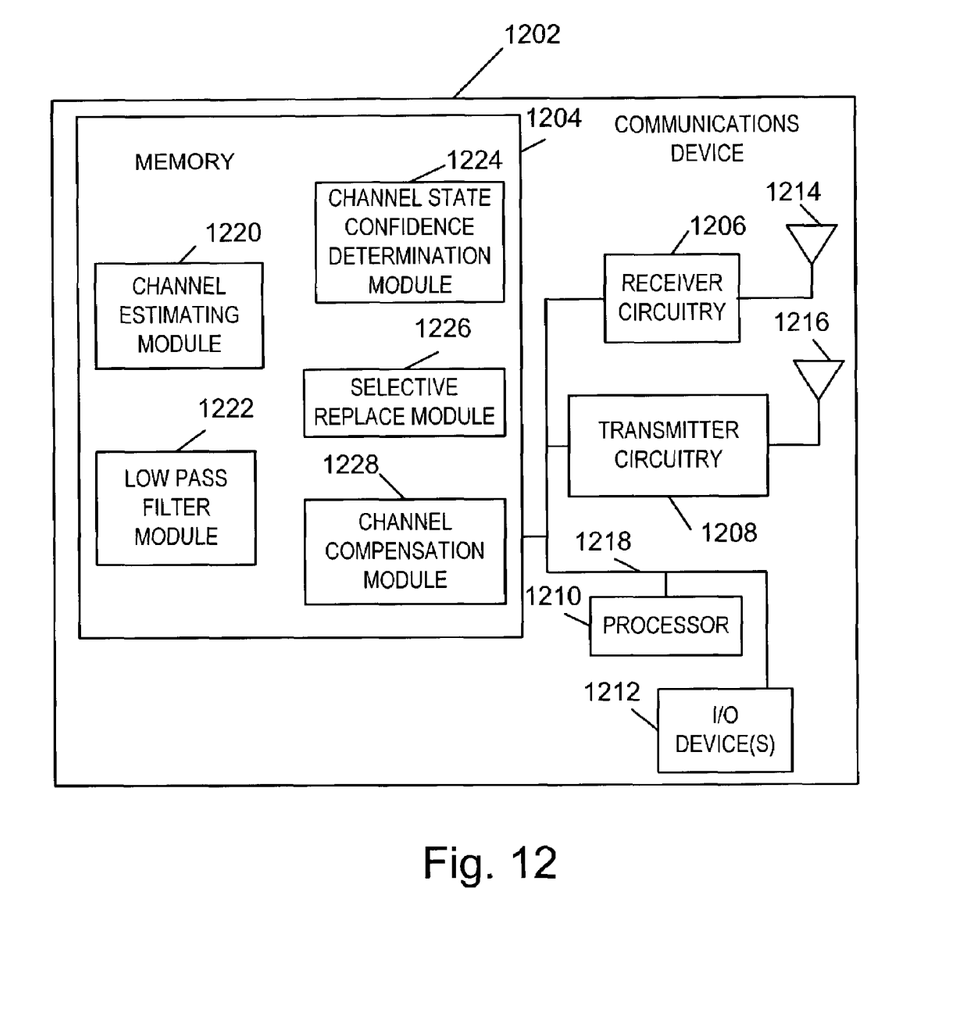
FIG. 12 illustrates an exemplary communications device implemented in accordance with the invention.

As discussed above, the method of the present invention can be implemented using software, e.g., in the form of modules stored on a machine readable data storage device such as a RAM device, hard disc or portable machine readable medium such as a floppy disc or compact disc (CD), to control a processor of a communications device to implement the method of invention. FIG. 12 shows one such embodiment.

FIG. 12 illustrates an exemplary communications device 1202 wherein the present invention is implemented through the use of software modules (1220, 112, 1224, 1226, 1228) executed by a processor 1210, e.g., CPU. The communications device 1202 includes memory 1204, receiver circuitry 1206, transmitter circuitry 1208, processor 1210 and input/output device 1212, coupled together by bus 1218 as shown in FIG. 12. The I/O devices 1212 may include a keypad, display, microphone, speakers and/or other known input and/or output devices. Antennas 1214, 1216 are coupled to the receiver circuitry 1206 and the transmitter circuitry 1216, respectively, for receiving and transmitting wireless signals, e.g., OFDM communications signals transmitted through a multi-tone communications channel, e.g., the air. Receiver circuitry 1206 supplies received OFOM communications signals, e.g., pilot tones and/or data, to the processor 1210 for processing under control of the modules included in memory 1204.

Memory 1204 includes a channel estimating module 1220, a low pass filtering module 1222, a channel state confidence determination module 1224, a selective replace module 1226 and a channel compensation module 1228 that each include machine executable instructions. These modules, when executed by processor 1210, control the communications device 1202 to perform the same operations as those performed by the like-named modules of the communication system 100 shown in FIG. 1.

Figure 13:
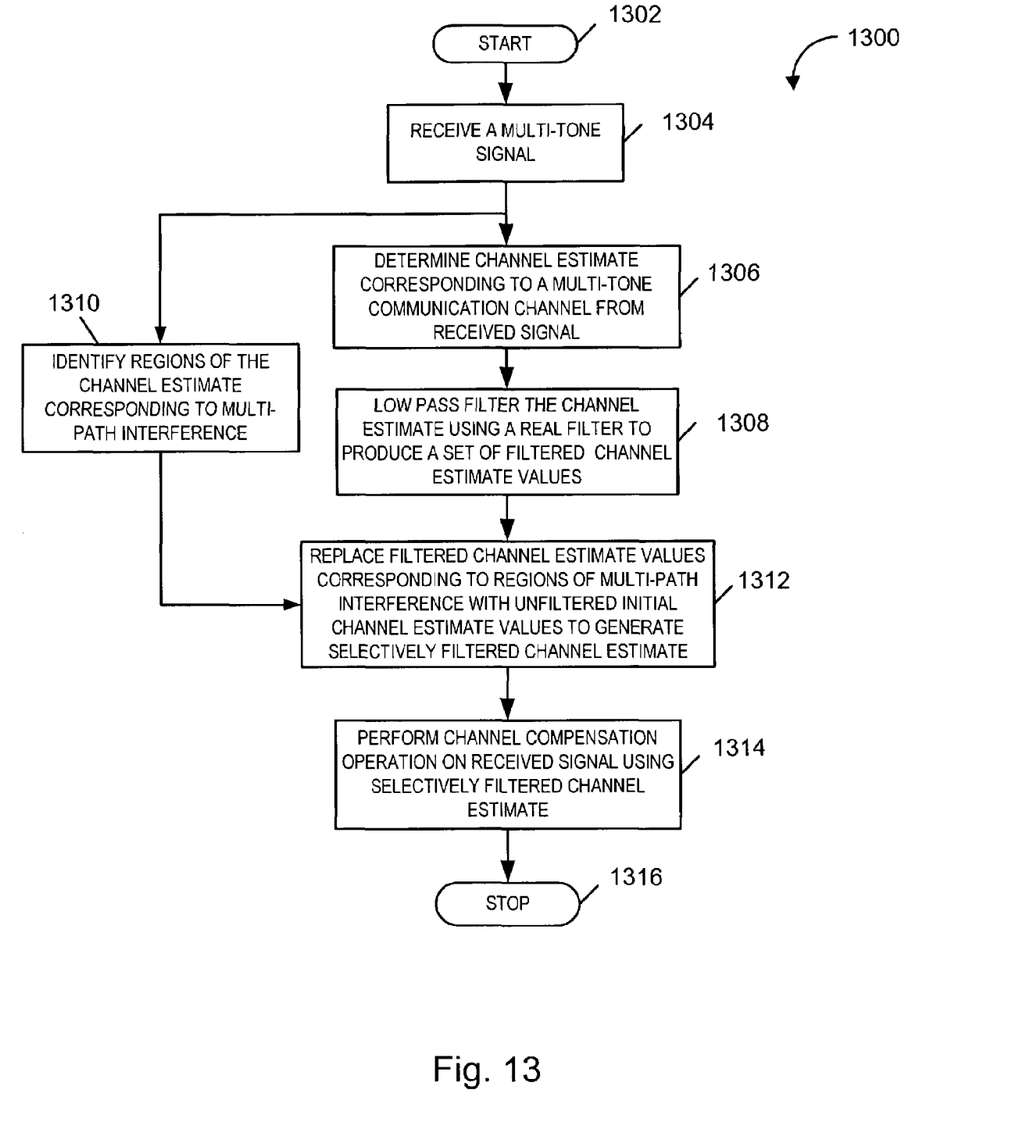
FIG. 13 illustrates an exemplary method implemented in accordance with the invention.

The steps of the method of the present invention, performed by the processor 1210 when operating under the control of the modules included in memory 1204, are shown in the flow chart 1300 of FIG. 13.

Processing in accordance with the present invention begins in start step 1302 wherein the various modules 1220, 1222, 1224, 1226, and 1228 are initially executed by the processor 1210. Operation proceeds from start step 1302 to step 1304, wherein a multi-tone signal is received, e.g., by antenna 1214 and receiver circuitry 1206 and the resulting signal information, e.g., data values, are supplied to the processor 1210. Operation proceeds from step 1304 along two parallel paths that may be performed at the same time.

A first processing path proceeds to step 1306, where an initial channel estimate corresponding to a multi-tone communication channel is determined, under the control of channel estimating module 1220, from the received signal. The channel estimate may include, e.g., one initial channel estimate value for the I and Q component of each tone of the received multi-tone signal. Each tone, and thus each initial channel estimate value, corresponds to a different frequency region.

The initial channel estimate values are subject to low pass filtering using a real low pass filter in step 1308. The real low pass filtering produces a set of filtered channel estimate values, e.g., one value for each of the I and Q components of each tone of the received multi-tone signal. The real low pass filtering is performed by low pass filter module 1222. The resulting filtered channel estimate values along with the initial channel estimate values are passed to processing step 1312.

In processing step 1310, which may be implemented in parallel with steps 1306, 1308, regions of the channel estimate corresponding to multi-path interference are identified. This step is performed by channel state confidence determination module 1224 which generates a CSI value for each tone in the above discussed manner and compares each CSI value to a threshold used to determine the presence of significant multi-path interference. If a received initial channel estimate value is determined to be below the threshold, the frequency region of the initial and filtered channel estimates corresponding to the CSI value failing to exceed the threshold are identified as corresponding to regions of multi-path interference. Processing proceeds to step 1312 from step 1310 wherein the identified multi-path region information is used.

In step 1312, the filtered channel estimate values corresponding to regions of multi-path interference, are replaced with unfiltered channel estimate values. In this manner a selectively filtered channel estimate is generated. In the case of multi-path interference, the selectively filtered channel estimate value includes at least one filtered channel estimate value and at least one unfiltered channel estimate value. Step 1312 is performed under control of selective replace module 1226.

In step 1314 channel compensation is performed on the received signal using the selectively filtered channel estimate. This step is performed under control of channel compensation module 1228 and may involve, e.g., applying an inverse of the selectively filtered channel estimate to the received data signals in an attempt to reverse the effect of the communications channel on the received signals, e.g., data. Operation of method 1300 stops in step 1316, but communications device 1202 can remain active to receive and process further multi-tone signals.

The steps of the various methods of the invention discussed above may be implemented in a variety of ways, e.g., using software, hardware or a combination of software and hardware to perform each individual step or combination of steps discussed. Various embodiments of the present invention include means for performing the steps of the various methods. Each means may be implemented using software, hardware, e.g., circuits, or a combination of software and hardware. When software is used, the means for performing a step may also include circuitry such as a processor for executing the software. Accordingly, the present invention is directed to, among other things, computer executable instructions such as software for controlling a machine or circuit to perform one or more of the steps discussed above.

What is claimed is:

1. A method of processing an initial channel estimate including a plurality of initial channel estimate values, the initial channel estimate corresponding to a multi-tone communications channel, the method comprising:
    filtering the initial channel estimate using a real filter to produce a filtered channel estimate including a set of filtered channel estimate values;
    identifying regions of said initial channel estimate corresponding to multi-path interference;
    performing a channel compensation operation using at least one initial channel estimate value corresponding to a channel estimate region where multi-path interference is identified and using at least one filtered channel estimate value in another channel estimate region;
    wherein said communications channel is a communications channel through which an orthogonal frequency division multiplexed signal is transmitted;
    wherein each of said initial communications channel estimate values corresponds to the frequency of a tone of said orthogonal frequency division multiplexed signal; and
    wherein said step of identifying regions of said initial channel estimate corresponding to multi-path interference includes identifying regions where said multi-path interference is sufficient to cause said filtering to produce filtered channel estimate values which are less accurate than the unfiltered channel estimate values corresponding to the same regions.

2. A method of processing an initial channel estimate including a plurality of initial channel estimate values, the initial channel estimate corresponding to a multi-tone communications channel, the method comprising:
    filtering the initial channel estimate using a real filter to produce a filtered channel estimate including a set of filtered channel estimate values;
    identifying regions of said initial channel estimate corresponding to multi-path interference;
    performing a channel compensation operation using at least one initial channel estimate value corresponding to a channel estimate region where multi-path interference is identified and using at least one filtered channel estimate value in another channel estimate region; and
    wherein channel estimate regions of multi-path interference are regions where the channel estimate values are degraded by performing said filtering using a real filter.

3. A method of processing an initial channel estimate including a plurality of initial channel estimate values, the initial channel estimate corresponding to a multi-tone communications channel, the method comprising:
    filtering the initial channel estimate using a real filter to produce a filtered channel estimate including a set of filtered channel estimate values;
    identifying regions of said initial channel estimate corresponding to multi-path interference;
    performing a channel compensation operation using at least one initial channel estimate value corresponding to a channel estimate region where multi-path interference is identified and using at least one filtered channel estimate value in another channel estimate region; and
    replacing filtered channel estimate values in said filtered channel estimate corresponding to regions of multi-path interference with unfiltered channel estimate values corresponding to said regions of multi-path interference to thereby produce a selectively filtered channel estimate.

4. The method of claim 3, wherein said step of:
    identifying regions of said initial channel estimate corresponding to multi-path interference includes:
        generating channel state information values from said initial channel estimate values;
        comparing each of said channel state information values to a threshold; and
        determining that a region of said initial channel estimate corresponding to a compared channel state information value corresponds to a region of multi-path interference when said threshold value is not exceeded.

5. The method of claim 3, wherein said step of:
    identifying regions of said initial channel estimate corresponding to multi-path interference includes:
    generating channel state information values from said initial channel estimate values; and
    comparing said channel state information values to a threshold.

6. The method of claim 3, wherein said step of performing a channel compensation operation using initial channel estimate values corresponding to channel estimate regions where multi-path interference is identified and using filtered channel estimate values in other channel estimate regions includes using said selectively filtered channel estimate.

7. The method of claim 6, wherein said real filter is a real low pass filter.

8. The method of claim 7,
    wherein said communications channel is a communications channel through which an orthogonal frequency division multiplexed signal is transmitted; and
    wherein each of said initial communications channel estimate values corresponds to the frequency of a tone of said orthogonal frequency division multiplexed signal.

9. A machine readable medium including machine executable instructions used to control a machine to perform the steps recited in claim 1.

10. A multi-tone communications apparatus, comprising:
    a real low pass filter circuit for performing a real low pass filtering operation on a set of initial channel estimate values to generate a filtered channel estimate including filtered channel estimate values;
    a channel state confidence computation module for identifying at least one initial channel estimate value resulting from multi-path interference; and a selective replacement module being coupled to said real low pass filter module to receive said filtered channel estimate and being coupled to said channel state confidence computation module, said selective replacement module generating a selectively filtered channel estimate by replacing at least one filtered channel estimate value with an identified initial channel estimate value.

11. The apparatus of claim 10, wherein channel state confidence computation module includes:
means for generating confidence state information values from said initial channel estimate values; and
a comparator for comparing said generated confidence state information values to a threshold value.

12. The apparatus of claim 11, wherein said threshold value is programmable, said channel state confidence computation module including an input for receiving said threshold value.

13. The apparatus of claim 11, further comprising:
a channel computation circuit coupled to said selective replacement module for performing a channel compensation operation as a function of the selectively filtered channel estimate generated by said selective replacement module.

14. The apparatus of claim 13, further comprising:
a channel estimate computation module coupled to said low pass filter and said channel state confidence computation module.

15. The apparatus of claim 14, wherein said channel estimate computation module is further coupled to said selective replacement module.

16. The apparatus of claim 15, wherein said channel state confidence computation module is coupled to said channel compensation module and provides weighting information to said channel compensation module used to weight different values included in said selectively filtered channel estimate as part of a channel compensation operation.

17. The apparatus of claim 15, wherein said channel estimate computation circuit computes a channel estimate for an orthogonal frequency division multiplied communications channel.

18. An apparatus for processing an initial channel estimate including a plurality of initial channel estimate values, the initial channel estimate corresponding to a multi-tone communications channel, the apparatus comprising:
means for filtering the initial channel estimate using a real filter to produce a filtered channel estimate including a set of filtered channel estimate values;
means for identifying at least one region of said initial channel estimate corresponding to multi-path interference;
means for performing a channel compensation operation using an initial channel estimate value corresponding to said at least one region of said initial channel estimate where multi-path interference is identified and using at least one filtered channel estimate value in another channel estimate region; and
means for replacing filtered channel estimate values in said filtered channel estimate corresponding to regions of multi-path interference with unfiltered channel estimate values corresponding to regions of multi-path interference to thereby produce a selectively filtered channel estimate.

* * * * *